United States Patent
Huie et al.

(10) Patent No.: US 8,608,487 B2
(45) Date of Patent: Dec. 17, 2013

(54) PHISHING REDIRECT FOR CONSUMER EDUCATION: FRAUD DETECTION

(75) Inventors: Scott Chapman Huie, Charlotte, NC (US); Lorettajean C. Maguire, Charlotte, NC (US); Jason Andrew Malo, Leesburg, VA (US); Todd Keith Inskeep, Charlotte, NC (US); David C. King, Charlotte, NC (US); David C. Shroyer, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 1241 days.

(21) Appl. No.: 11/947,599

(22) Filed: Nov. 29, 2007

(65) Prior Publication Data

US 2009/0144308 A1    Jun. 4, 2009

(51) Int. Cl.
*G09B 19/00* (2006.01)
*G06F 7/00* (2006.01)

(52) U.S. Cl.
USPC ............................... 434/433; 726/22; 726/26

(58) Field of Classification Search
USPC .................. 434/107, 118, 433; 709/223, 239; 705/51; 726/3, 22, 26
See application file for complete search history.

(56) References Cited

U.S. PATENT DOCUMENTS

| | | | |
|---|---|---|---|
| 8,103,875 B1 * | 1/2012 | Ramzan et al. | 713/170 |
| 8,201,259 B2 * | 6/2012 | Pietraszek et al. | 726/26 |
| 2003/0123465 A1 * | 7/2003 | Donahue | 370/401 |
| 2004/0078422 A1 * | 4/2004 | Toomey | 709/202 |
| 2004/0139182 A1 * | 7/2004 | Chang et al. | 709/223 |
| 2004/0210532 A1 * | 10/2004 | Nagawa et al. | 705/51 |
| 2006/0095955 A1 * | 5/2006 | Vong | 726/3 |
| 2007/0136806 A1 * | 6/2007 | Berman | 726/22 |
| 2009/0031033 A1 * | 1/2009 | Deng et al. | 709/229 |
| 2009/0055551 A1 * | 2/2009 | Baxter et al. | 709/239 |
| 2010/0169195 A1 * | 7/2010 | Trest | 705/34 |

* cited by examiner

*Primary Examiner* — Kang Hu
(74) *Attorney, Agent, or Firm* — Banner & Witcoff, Ltd.; Michael A. Springs

(57) ABSTRACT

A method and system for detecting fraud may redirect a user from a phishing message to an education message. The phishing message may include a phishing website that mimics a target entity. A user may be convinced to disclose sensitive information to a fraudster operating the phishing website. The phishing website may be maintained through a service provider and the target entity may request that the service provider disable the phishing website. During evaluation of the target entity's request by the service provider, a user may be directed to an education website that may be displayed until the phishing website may be permanently disabled. The education website may include information or identify a source of information that may help educate the user on fraud prevention, phishing, the target entity, the targeted industry, future prevention tips and suggestions, and other related information.

18 Claims, 5 Drawing Sheets

PHISHING REDIRECT FOR CONSUMER EDUCATION: FRAUD DETECTION

FIELD OF THE TECHNOLOGY

Aspects of the disclosure relate to educating users of a computer network about fraudulent websites and directing users away from fraudulent websites. More specifically, aspects of the disclosure describe systems and methods for detecting fraudulent websites and redirecting a user away from the fraudulent website.

BACKGROUND

Computer networks, specifically the Internet, have become a central and lively place for conducting business. Many financial transactions are conducted on the Internet and large quantities of personal information are stored on the Internet. Conducting business and personal affairs has become very common and communication between people and entities has been streamlined as a result of the advancements in communications technology, such as the Internet.

Almost as quickly as the Internet developed, fraudsters began preying on users and consumers. Fraudsters capitalized on the opportunity to fool users and consumers into disclosing personal and financial information. For example, fraudsters create websites that mimic an entity requesting personal or financial information from a user and/or consumer. Phishing arose quickly as a means of acquiring sensitive information such as usernames, passwords, credit card information, social security numbers, and other unique information that may be associated with a user's online account with a target entity. Due to the sensitive nature of the information that is oftentimes required to access an online user account at a financial institution, a user is usually required to enter a username and password to be permitted to access the user's online account where the user may conduct financial transactions, pay bills, transfer money, and the like.

Many fraudulent activities, including phishing, carry criminal and civil punishments in most countries. Further, some users refrain from using online services due to the risk of the identity, financial, or other personal misappropriation that may be result in identity theft, stolen money, and other serious financial and personal injuries. In response to an increasing demand from consumers and users, many entities offer online services to streamline the customer's and user's experience in transacting business. In offering online services, the entity must protect its customers and users and must set up security precautions to prevent the user's personal and financial information from being accessed, seen, or stolen by a fraudster.

Fraudsters may target specific industries and thus may target individual entities, such as financial institutions offering online banking services. The target entity may have control over the disclosure of a user's personal or financial information that may be controlled or maintained by the target entity (e.g., such as encrypting data communicated over a computer network that contains a user's sensitive information). However, the fraudsters implementing a phishing attack may send a phishing message containing a link to or a pointer for a phishing website that emulates the website of the target entity. Once the target entity detects a phishing website, the target entity requests that the service provider disable the phishing website (i.e., the entity maintaining the phishing website and through which the fraudster may display the phishing website to users). The request usually takes some time to evaluate the request and confirm that the request is valid.

Meanwhile, users may access the phishing website and continue to be exposed to fraud during the evaluation process. The service provider for the phishing website may display an error message in place of the phishing website or may direct or point the user's request to an error message website. During this evaluation period, the users are still exposed to the fraud and the fraudsters may continue to prey on users.

When a user receives an error message, the user is oftentimes confused and may conclude that the legitimate target entity website is not operating properly. Further, the user may be alerted that suspicious activities are present and may lose confidence in accessing online user accounts and in conducting business and/or financial transactions with the target entity. Therefore, a method of detecting fraud is needed that is capable of educating a user and helping to prevent fraud that occurs outside of the control of the security measures that may be implemented by a target entity.

BRIEF SUMMARY OF THE INVENTION

Aspects of the present disclosure address one or more of the issues mentioned above by describing a system and method for detecting fraud and preventing phishing attacks. The following presents a simplified summary of the disclosure in order to provide a basic understanding of some aspects of the systems and methods of detecting fraud. It is not intended to identify key or critical elements of the invention nor is it intended to delineate the scope of the invention. The following summary merely presents some concepts of the disclosure in a simplified form as a prelude to the more detailed description provided below.

In one aspect of the invention, a method of detecting fraud may comprise: (a) compiling education data displayable on an education website; (b) storing the education data in a memory on a server that is accessible by at least one computing device; (c) detecting a fraud website on a computer network accessible by a computing device; (d) sending a request to a service provider of the computer network to disable the fraud website; and (e) causing the education data to be presented to the user when the user selects the fraud website.

In another aspect of the invention, a method of protecting a user of an online financial institution website, may comprise: (a) creating and storing an education website; (b) identifying a phishing message including a fraud website; (c) requesting a service provider of the fraud website to cause the fraud website to be disabled; (d) selecting the fraud website; and (e) causing the user to be directed to the education website and preventing the user from receiving an error message.

In another aspect of the invention, a computer-readable medium may comprise computer-executable instructions to perform a method that comprises: (a) compiling education data displayable on an education website; (b) storing the education data in a memory on a server that is accessible by at least one computing device; (c) detecting a fraud website on a computer network accessible by a computing device; (d) sending a request to a service provider of the computer network to disable the fraud website; and (e) causing the education data to be presented to the user when the user selects the fraud website.

In yet another aspect of the invention, an apparatus for mitigating fraud may comprise: (a) a server comprising memory for storing data in a data file, the memory storing a plurality of modules comprising computer-executable instructions, the plurality of modules including: a detecting module for detecting a phishing message and identifying a phishing website maintained by a service provider; a directing module for causing a user selecting a phishing website to be redirected to an education website; and a disabling module for requesting that the phishing website be disabled and disabling the phishing website; (b) a computing device capable of receiving the phishing message and capable of accessing the phishing website; (c) a processor for executing computer-executable instructions to perform a method, comprising: detecting the phishing message and identifying the phishing website; sending a request to the service provider to disable the phishing website; and causing the user directing the user to the education website in response to the user selecting the phishing website.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. Additional specific arrangements of parts, example devices, systems, and environments may be utilized and structural and functional modifications may be made without departing from the scope of the present invention. The various figures in this application illustrate examples of a system and method of detecting fraud. When the same reference number appears in more than one drawing, that reference number is used consistently in this specification and the drawings to refer to the same or similar parts throughout.

Figure 1:
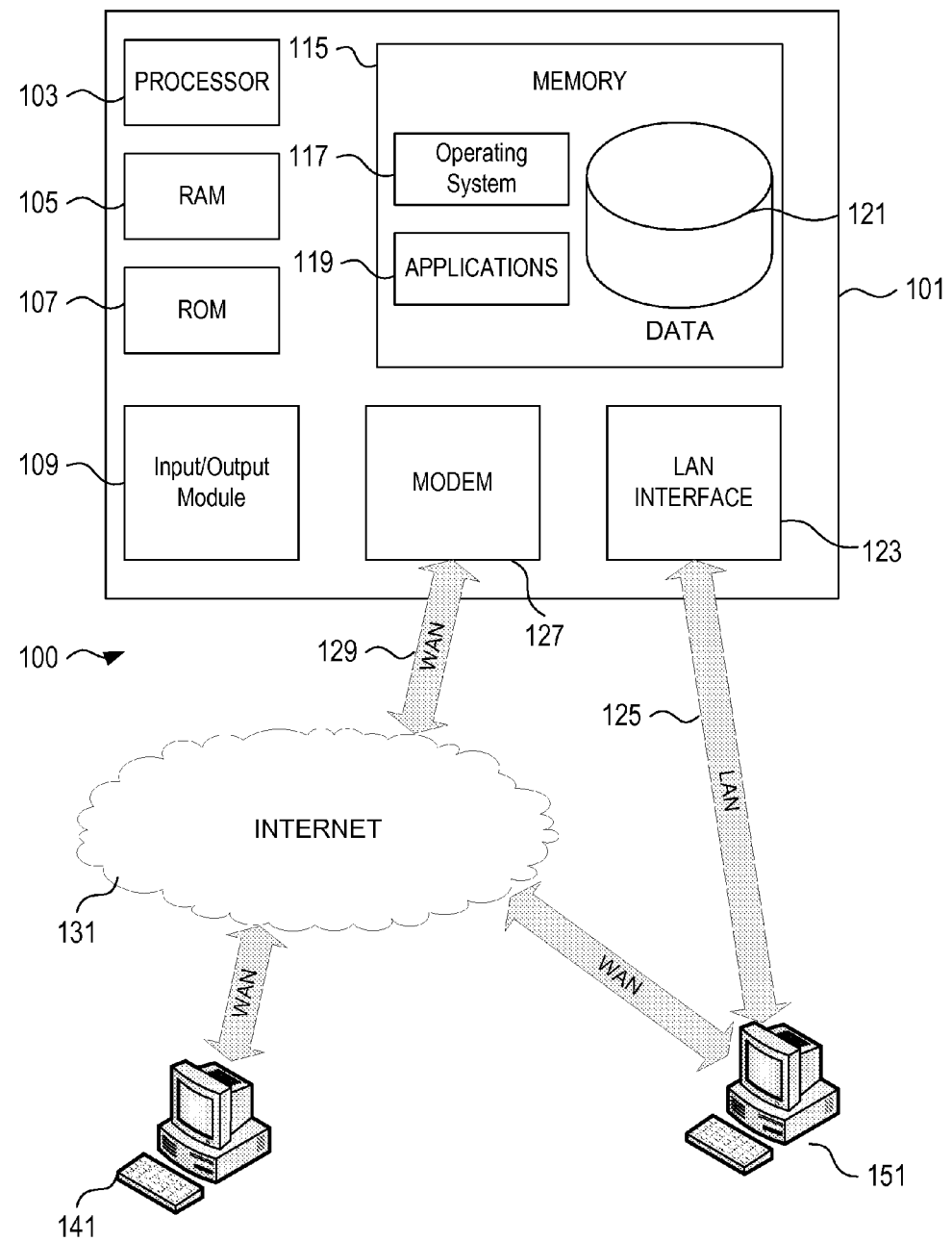
FIG. 1 illustrates a computing system in accordance with an aspect of the invention.

The system and method of detecting fraud may be embodied in a computing system environment. FIG. 1 illustrates an example of a computing system environment 100 that may be used according to one or more embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of the illustrated components.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer executable instructions, such as program modules, being executed by a computer. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, an input/output module or BIOS 109, and a memory 115. The computer 101 typically includes a variety of computer readable media. The computer readable media may be any available media that may be accessed by the computer 101 and may include both volatile and nonvolatile media and removable and non-removable media. By way of example, and not limitation, computer readable media may comprise computer storage media and communication media.

Computer storage media may include volatile and nonvolatile and removable and non-removable media implemented in any method or technology for storage of information such as computer readable instructions, data structures, program modules, or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, and any other medium that can be used to store the desired information and that can be accessed by the computer 101.

Communication media may embody computer readable instructions, data structures, program modules, and/or other data in a modulated data signal such as a carrier wave or other transport mechanism. It may also include any information delivery media. A modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media. Although not shown, RAM 105 may include one or more applications representing the application data stored in RAM 105 while the computer is on and corresponding software applications (e.g., software tasks) are being executed.

The input/output module or BIOS 109 may include a microphone, keypad, touch screen, and/or stylus through which a user of the computer 101 may provide input. The input/output module or BIOS 109 may also include one or more of a speaker for providing audio output and a video display device for providing textual, audiovisual, and/or graphical output.

Software may be stored within memory 115 and/or storage to provide instructions to the processor 103 for enabling the computer 101 to perform various functions. For example, the memory 115 may store software used by the computer 101, such as an operating system 117 and an associated data file 121. Alternatively, some or all of the computer executable instructions for the computer 101 may be embodied in hardware or firmware (not shown). As described in detail below, the data file 121 may provide centralized storage of data.

The computer 101 may operate in a networked environment that supports connections to one or more remote computers, such as computing devices 141 and 151. The computing devices 141 and 151 may be personal computers or servers that include many or all of the elements described above relative to the computer 101. The network connections depicted in FIG. 1 may include a local area network (LAN) 125 and a wide area network (WAN) 129 and may also include other networks. The computer 101 is connected to the LAN 125 through a network interface or adapter 123. The computer 101 may be a server and may include a modem 127 or other means for establishing communications over the WAN 129. For example, the computer 101 may connect to a WAN 129 such as the Internet 131 through a modem connection. The network connections may include any communications link between computers.

The existence of any of various well-known protocols such as TCP/IP, Ethernet, FTP, HTTP, and the like is presumed, and the system can be operated in a client-server configuration to permit a user to retrieve web pages from a web-based server. Any of various conventional web browsers can be used to display and manipulate data on web pages.

Additionally, an application program may be used by the computer 101 according to an embodiment of the invention. The application program may include computer executable instructions for invoking user functionality related to communication, such as email, short message service (SMS), and voice input and speech recognition applications.

The computing devices 141 or 151 may also be mobile terminals including various other components, such as a battery, speaker, and antennas (not shown). The input/output module or BIOS 109 may include a user interface including such physical components as a voice interface, one or more arrow keys, joystick, data glove, mouse, roller ball, touch screen, or the like.

Each of the plurality of computing devices 141, 151 may contain software for creating a data file 121. The software may be a set of detailed computer-executable instructions for the computing devices 141, 151. The software may provide the computing devices 141, 151 with the ability to create a data file 121. The data file 121 may contain multiple individual files of information. For example, a plurality of inventory may be managed and information relating to each inventory may be received onto a computer network. The information relating to each inventory may be separately contained in a unique data file 121. One or more of the data files relating to a plurality of inventories may be coupled to each other in any suitable fashion.

The computer 101 may include memory 115 for storing computer-readable instructions and a processor 103 for executing the computer-executable instructions. The computer-executable instructions may be data in the form of program source code that may be capable of modifying the data file 121. The computer-executable instructions may be a series or sequence of instructions for a computing device that is typically in the form of a programming language such as C++, Java, SQL, or the like. Various computer programming languages may be used to create the computer-executable instructions, and the invention is not limited to the programming languages listed above.

The memory 115 may be a portion of the computer 101 that stores data or other instructions. The memory 115 may be retained or lost when power is lost to the system. The memory 115 may provide access to data for a user or computing device 141, 151 to revise and manage a data file 121.

The processor 103 may be capable of executing the computer-executable instructions. The computer-executable instructions may be executed by the processor 103 after they have been stored in the memory 115. The processor 103 may be a centralized element within a computing system that is capable of performing computations. For example, the processor 103 may perform the computations that are described in the computer-executable instructions and then execute the computer-executable instructions. The computer-executable instructions may include data describing changes to the data file 121 that were made by a user or computing device 141, 151 over a computer network such as the Internet 131. The computer 101 stores the data in the data file 121 that may be associated with fraud detection. The data file 121 may be stored in the memory 115 so that it may be accessible to a plurality of computing devices 141, 151 and/or users.

Data relating to fraud detection may be stored in the data file 121. Security precautions may be implemented to prevent unauthorized access to the data file 121. A user identification and a password may be required to access the data file 121 and/or the data relating to fraud detection. Some of the data that is stored in the data file 121 may be shared between multiple data files. Any desirable security precautions may be implemented.

The computer-executable instructions may be a series or sequence of instructions for a computing device 141, 151, described in detail throughout this disclosure. The processor 103 may be configured to execute the computer-executable instructions that may be used to detect fraud. Such computer-executable instructions may be located (e.g., physically or logically) in modules in the memory 115. The computer network 131 may be any network that interconnects users and/or computing devices 141, 151. According to at least one aspect of the invention, the computer network 131 may provide shared access by two computing devices to at least a portion of the data in the plurality of modules. Shared access may be two or more computing devices 141, 151 that may be coupled to the computer network 131 and/or that may be able to communicate with each other and/or access, change, and add data to a data file 121.

A computer network such as the Internet 131 provides access to the date file 121 that may be shared between the computing devices 141, 151. Additionally, the computer network may be public or private and may be wired or wireless. The computing devices 141, 151 that are coupled to the computer network may be any electronic device that is capable of connecting to a computer network and transmitting data over the computer network. Further, the computing devices are capable of receiving data for entry into a data file 121 that may be associated with detecting fraud.

Figure 2:
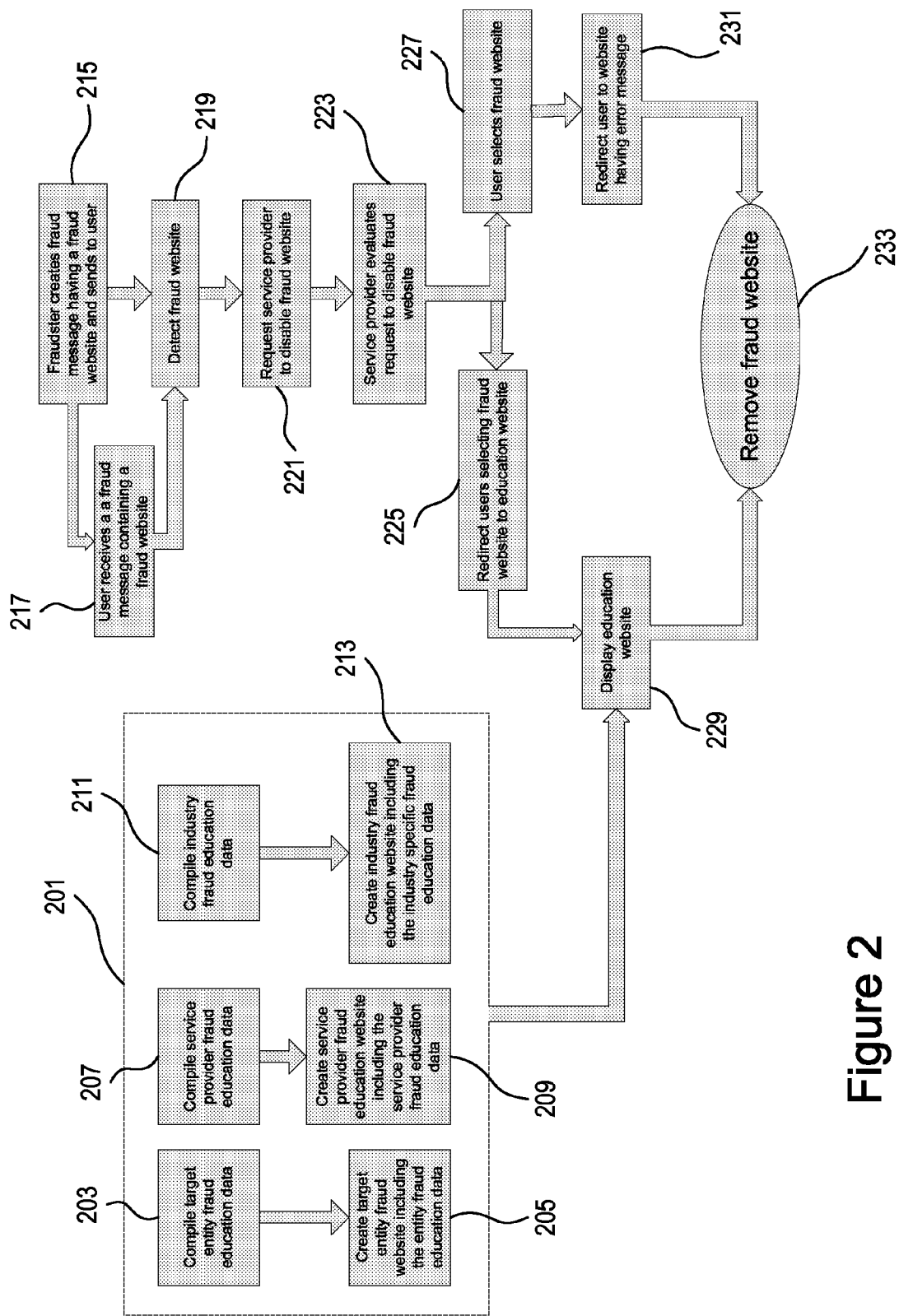
FIG. 2 illustrates a method of detecting fraud by directing a user away from a phishing website, according to an aspect of the invention.

FIG. 2 illustrates a method of detecting fraud and educating a user about the fraud, in accordance with an embodiment of the invention. A method of detecting fraud may include: (a) compiling education data relating to a target entity, fraud prevention and detection, and industry-specific fraud problems; (b) creating a website including data relating to the target entity, fraud detection and prevention, and information about the industry targeted by the fraudster; (c) creating a fraud or phishing message having a fraud or phishing website; (d) selecting the fraud or phishing website from the fraud or phishing message; (e) detecting the fraud or phishing message and/or website; (f) requesting a service provider for the fraud or phishing website to disable the fraud or phishing website; (g) evaluating whether the request is valid; (h) directing a user selecting the fraud or phishing website to one of an education website and an error website; (i) displaying the education website or the error website; and (j) removing the fraud or phishing website.

Step 201 may include compiling education data and creating an education website for displaying education data. Entity fraud education data may be compiled in step 203 and an entity fraud website including the entity fraud education data may be created in step 205. Service provider fraud education data may be compiled in step 207 and a service provider fraud education website including the service provider fraud education data may be created in step 209. Industry fraud education data may be compiled in step 211 and an industry fraud education website including the industry fraud education data may be created in step 213.

A fraudster may create a fraud message having a fraud website in step 215. The fraudster may send the fraud message to one or more users. The users may be users associated with a target entity, such as a financial institution. The fraud message may be a phishing message designed to fool the user into disclosing sensitive information.

The user may receive the fraud message and may select the fraud website within the fraud message, in step 217. The fraud message and/or the fraud website may be detected, as illustrated in step 219. The detection of fraud 219 may occur in any suitable fashion.

The fraud website may be maintained by a service provider. The service provider may be sent a request to disable the fraud website, as illustrated in step 221. The request may be sent by a user, a target entity, or any other detecting entity or individual.

A service provider may evaluate the request to disable the fraud website at step 223. The evaluation may occur in any suitable fashion and may result in any punishment, including but not limited to disabling the fraud website, redirecting users of the fraud website to an education website, reporting the fraud website to an authority, preventing the owner of the fraud website from registering future websites, or the like.

While the service provider evaluates the fraud website, the user may be redirected to an education website, described in detail above. When the user selects the fraud website, the user may be sent an alert that the fraud website may not be sponsored by the target entity, the user may be automatically redirected to an education website, the user may be notified that they are visiting a fraud website under evaluation by the service provider, the user may be permitted to select whether the user will visit the fraud website in step 227 or the education website in step 225, or any other suitable user option. The education website may be displayed 229 in lieu of the fraud website, in addition to the fraud website, or as a warning or precursor to the fraud website.

The user may also be permitted to select the fraud website at 227 and may be redirected to an error message, as illustrated in 231. The user may be redirected from the fraud website to the education website and/or the error website in any suitable fashion. The fraud website may be removed, as illustrated in step 233. In some examples, the fraud website is permanently removed and the user is no longer redirected from the fraud website to the education website or the error website. After a fraud website is removed in step 233 or disabled, a user entering the fraud website's locator or URL may automatically be directed to the education website or an error website (e.g., the service provider may insert a pointer into the program code for the fraud website to prevent a user from accessing the fraud website and to cause the user to automatically view the education website, the authentic target entity website, and or any other suitable, non-fraudulent option).

For example, a method of detecting fraud may comprise: (a) compiling education data displayable on an education website; (b) storing the education data in a memory on a server that is accessible by at least one computing device; (c) detecting a fraud website on a computer network accessible by a computing device; (d) sending a request to a service provider of the computer network to disable the fraud website; and (e) causing the education data to be presented to the user when the user selects the fraud website.

Fraud may include any deceptive activity that may cause harm to a user or customer. Oftentimes, the fraud may be directed towards users and customers of a financial institution that create a user account. The financial institution user account may include sensitive user information such as personal contact information, account numbers, social security number, mother's maiden name, and other identifying information. The fraud may occur in any industry and may target any entity having users and/or customers. Entities offering a website and a user account that may be accessible over the website may be placed at a high risk of fraud attacks.

Education data may be compiled and may include information relating to fraud, phishing, a target entity, an industry, fraud prevention tactics, tips for identifying future phishing attacks, and any other suitable information. The education data may be displayed on an education website that may be accessible by a user. The education website may be stored in memory located on a server operated by any suitable entity such as a target entity, a user/consumer protection entity, the government, an industry standards body, a service provider, and the like.

The education website and education data may be accessible by a computing device such as a personal computer, laptop, cellular telephone, or any other suitable device. The computing device may be configured to access a computer network such as the Internet and may send a request to the server to access the education website stored on the server.

A fraud website may be any website that mimics a target entity or otherwise deceives or intends to deceive a user for malicious reasons (e.g., stealing a user's money and/or identity). A fraud website may be detected in any suitable manner and may be detected by a target entity, a service provider, an application designed to verify websites, a user, an industry standards body, a government entity, or any other entity or individual.

Figure 3:
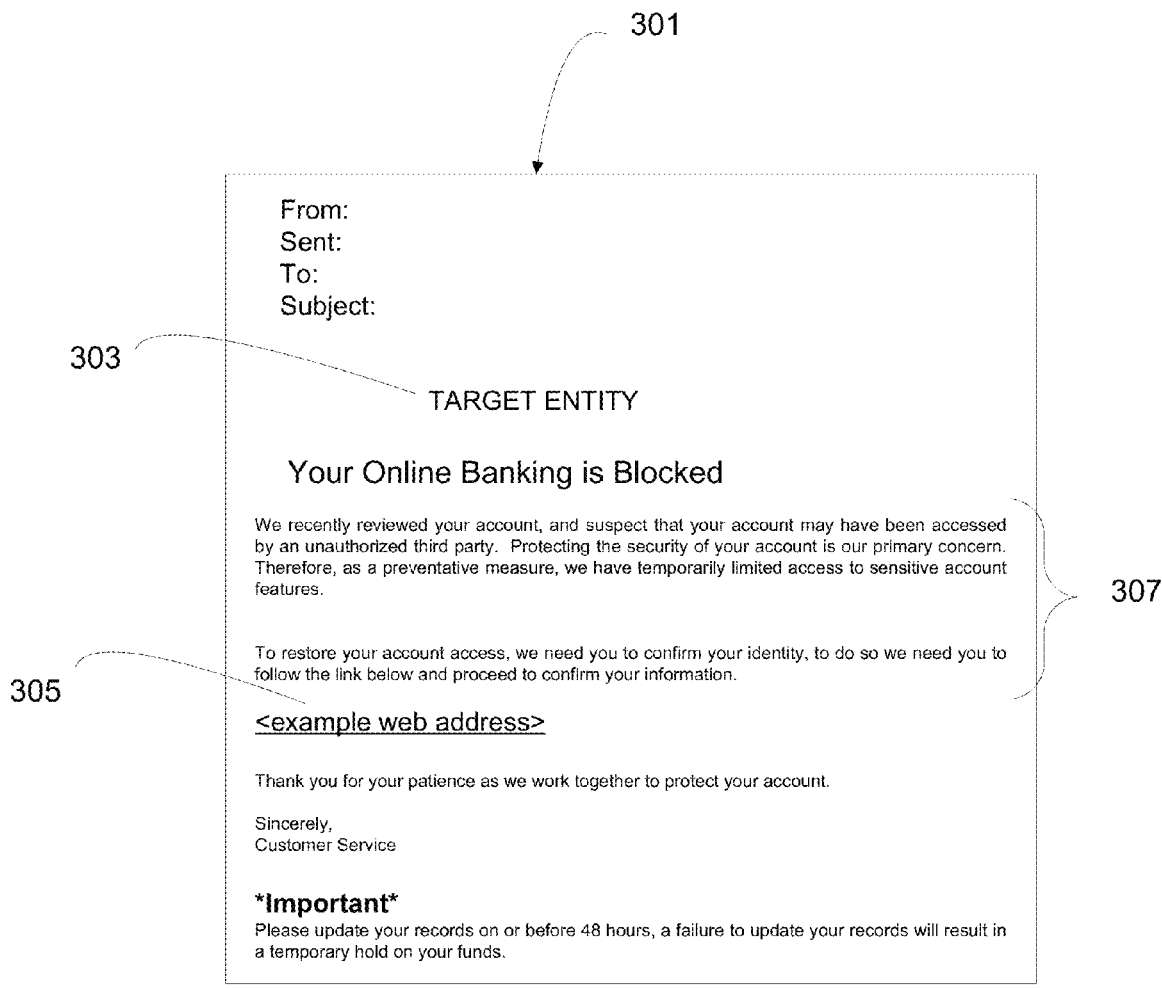
FIG. 3 illustrates a phishing message, according to an aspect of the invention.

As illustrated in FIG. 3, the fraud message 301 may include information relating to a target entity 303 and a fraud website link. FIG. 3 shows a phishing message 301 that may be sent by a fraudster (not shown) and may be received by a user of a financial institution. The user may receive the phishing message 301 in the form of an email. The phishing message 301 may include convincing text 307 that may prompt a user to select the phishing website 305.

A request may be sent to the service provider to disable a fraud website. The request may be sent by any entity identifying, detecting, or suspecting a fraud website, such as a financial institution detecting a phishing website attempting to obtain sensitive user information. The request may include a request to suspend the privileges of the fraud website, a request to disable the fraud website on a temporary or permanent basis, a request to investigate the website, and/or any other information.

In many examples, a target entity, such as a financial institution, may request that the fraud website be disabled by the service provider. The service provider may evaluate the veracity of the request and may determine a negative consequence, if necessary. During the evaluation period, a user selecting the fraud website, intentionally or inadvertently may be redirected to the education website described above. For example, a financial institution may detect fraud by identifying a phishing attack that lures online users to select a locator that displays a website that mimics the financial institution's authentic website. The financial institution may send a request to the fraud website's service provider that the service provide suspend, disable, or otherwise prevent the fraud website from being displayed to a user. The service provider may perform an investigation into the financial institution's request or otherwise evaluate the request.

A period of time may lapse during which the service provider may perform the evaluation of the financial institution's request to disable a fraud website. The service provider may permit the financial institution to alter the program code of the fraud website to redirect a user selecting the fraud website's locator or unique identifier (e.g., a website or uniform resource locator (URL)) to an education website. The user may be directed to the education website that may be configured to display information relating to the fraud, the target entity, phishing, the service provider, industry-specific information, or any other suitable information. When the user selects a link or pointer that is configured to display the fraud website, the user may be redirected to the education website and may not be permitted to access the fraud website.

In some situations, the user may be directed to an error website that may be configured to display generic error information such as information to indicate a problem with the host server, the communication, the connection, and the like. The generic error information may or may not reveal the reason for the error. The error website may be displayed at any suitable time, including after suspicious behavior is detected by the fraud website, after a request to disable the fraud website is received by the service provider, and the like.

Figure 4:
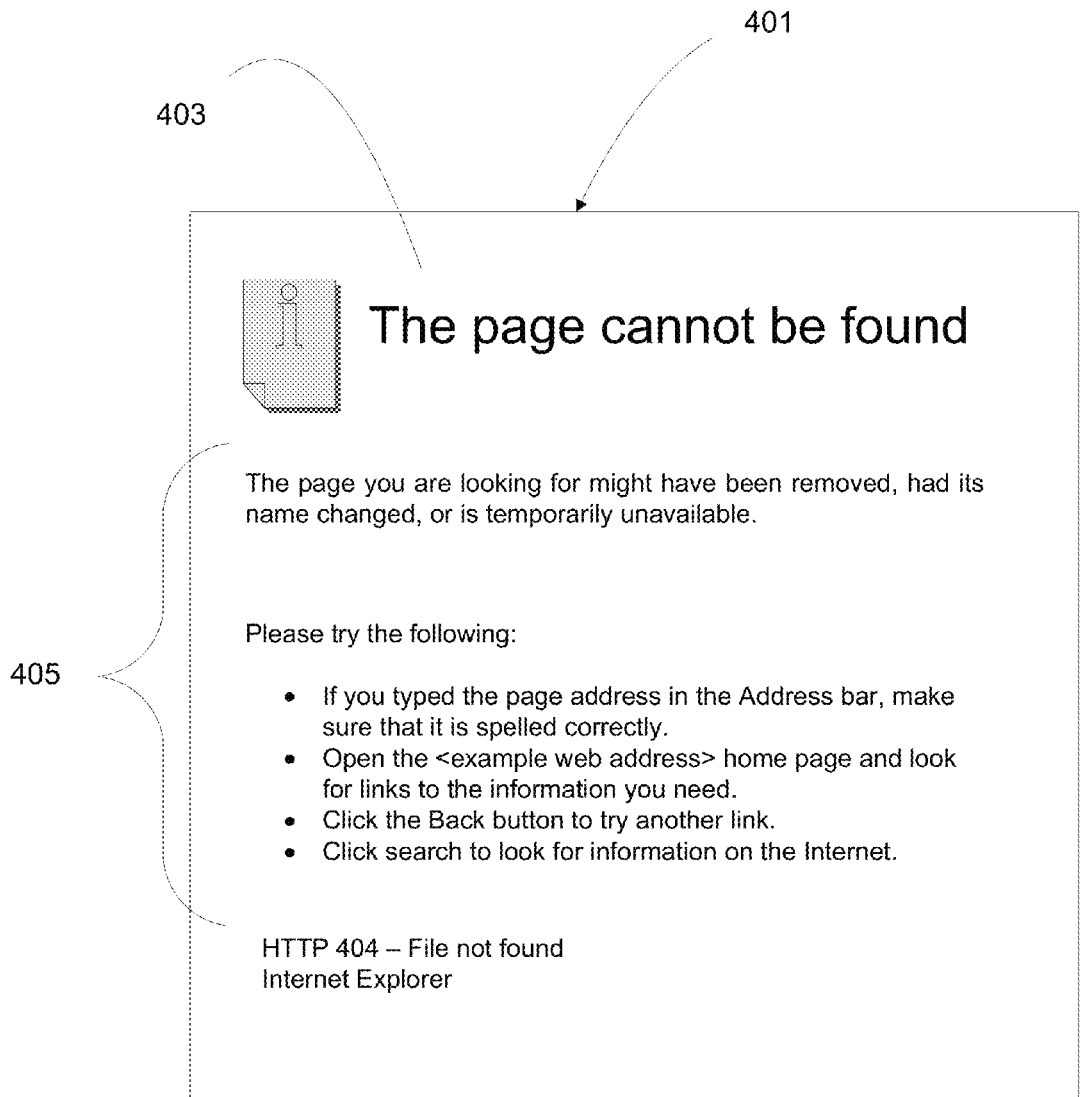
FIG. 4 illustrates an error message, according to an aspect of the invention.

FIG. 4 illustrates an error website 401 including an error message 403 and a generic text 405 that may describe an error. The error message 403 may include an explanation of the error, may include a conclusion that the error occurred without an explanation, or any other suitable error message. The generic text 405 may include information relating to troubleshooting and may not include an explanation of the reasons why the error message 401 is being displayed. Users may become confused by the generic text 405 that is illustrated in FIG. 4 because it does not provide an explanation of the reasons for the error message. The users may also be led to believe that the target entity's website is the source of the error, which may also lead to decreased confidence in the target entity and conducting transactions or accessing user account information on the target entity's website.

Figure 5:
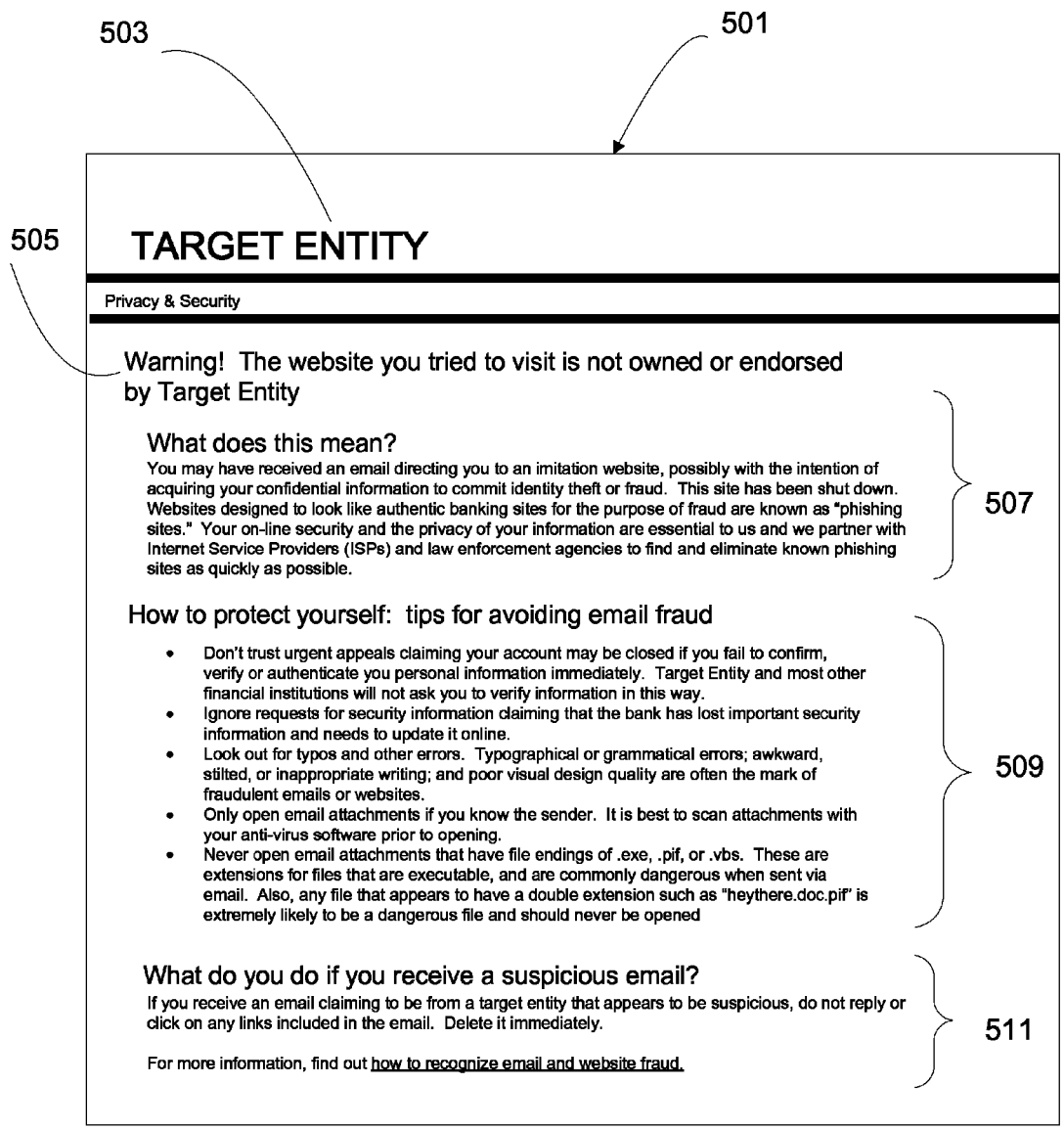
FIG. 5 illustrates an education message, according to an aspect of the invention.

A user may be redirected to an education website 501, as illustrated in FIG. 5. The education website 501 may display education information substantially immediately after the detection of fraud, within a short period of time after the request for disabling the fraud website is received by the fraud website's service provider, or any other rapidly responding period of time. Although a user may be redirected to the education website within any suitable period of time after fraud is detected on a fraud website, most often the redirect occurs immediately after the fraud is detected to prevent further fraud on users.

The education website may include target entity identifying information 503 that may present the authentic version of the target entity's identifying information (e.g., a logo, trademark, and the like). The education website 501 may also include an alert 505, such as a warning or text describing that the fraud website or phishing website is not endorsed by the target entity. The education website 501 may also include an explanation 507 of the type of fraud that occurred. For example, the explanation 507 illustrated in FIG. 5 explains the nature of a phishing message and the tactics employed by fraudsters maintaining a phishing website.

An education website 501 may also include information relating to fraud prevention 509. The information relating to fraud prevention 509 may include tips and suggestions for the user to implement to prevent future fraud. The information relating to fraud prevention 509 may describe common threats, may explain common features of fraud, such as phishing messages, and may provide the user with additional resources for learning more about fraud, phishing, and the security strategies for preventing them.

The education website 501 may include instructions 511 for notifying the target entity, a service provider, a standards body, a government agency, or any other entity of a phishing message, suspicious message, or other fraudulent behavior. The instructions 511 may include contact information for notifying the target entity of the fraud.

For example, the education website may be displayed instantaneously after the request to disable to fraud website is made to the fraud website's service provider. The information relating to the fraud website may be identified and may be stored in a data store that may be continuously updated to contain the most recent data to detect and identify fraudulent behavior. The data store may generate a report and may be dynamically updated to reflect information that helps to detect fraud from any entity.

A method and system for detecting fraud may further comprise removing the fraud website and/or disabling the fraud website. The service provider that hosts the fraud website may enforce any suitable punishment upon the owners or operators of the fraud website. The service provider may temporarily or permanently suspend the fraud website and may prevent the owner of the fraud website from obtaining websites in the future.

A method of fraud detection may also include protecting a user of an online financial institution website. The method of protecting a user of a financial institution's website may comprise: (a) creating and storing an education website; (b) identifying a phishing message including a fraud website; (c) requesting a service provider of the fraud website to cause the fraud website to be disabled; (d) selecting the fraud website; and (e) causing the user to be directed to the education website and preventing the user from receiving an error message.

A computer-readable medium may comprise computer-executable instructions to perform a method. The method may comprise: (a) compiling education data displayable on an education website; (b) storing the education data in a memory on a server that is accessible by at least one computing device; (c) detecting a fraud website on a computer network accessible by a computing device; (d) sending a request to a service provider of the computer network to disable the fraud website; and (e) causing the education data to be presented to the user when the user selects the fraud website.

In another embodiment, a fraud detection system may include an apparatus for mitigating fraud including: (a) a server comprising memory for storing data in a data file, the memory storing a plurality of modules comprising computer-executable instructions; (b) a computing device capable of receiving the phishing message and capable of accessing the phishing website; and (c) a processor for executing computer-executable instructions to perform a method. The plurality of modules may include: (a) a detecting module for detecting a phishing message and identifying a phishing website maintained by a service provider; (b) a directing module for causing a user selecting a phishing website to be redirected to an education website; and (c) a disabling module for requesting that the phishing website be disabled and disabling the phishing website. The method performed by the computer-executable instructions may include: (a) detecting the phishing message and identifying the phishing website; (b) sending a request to the service provider to disable the phishing website; and (c) causing the user directing the user to the education website in response to the user selecting the phishing website.

The detecting module may detect a phishing message and may identify a phishing website maintained by a service provider. The detecting module may detect the phishing message in any suitable fashion. The detecting module may receive information to aid in detecting the phishing message. For example, a user may receive a phishing message in the form of an email and may include a phishing website. The phishing message may mimic an email that may be received from the user's financial information. The phishing message may include the financial institution's logo, trademark, trade dress, motto, or other identifying features.

The phishing message may request that the user confirm the user's sensitive information, such as account information, security passwords, or other personal information. The user may suspect that the phishing message is not genuine and may report it to the financial institution. The phishing message may also be detected by the financial institution itself. The phishing message may attempt to convince the user to disclose sensitive information on the phishing website, via text message, telephone call, or instant message, and/or by mail. The phishing message may request that the user communicate the user's sensitive information in any suitable medium.

A directing module may cause a user selecting a phishing website to be redirected to an education website. The directing module may request that the program code directing a user to a phishing website instead redirect the user to an education website or provide a pointer from the phishing website to an error page or an education website. A disabling module may request that the phishing website be disabled and may disable the phishing website, as described in detail above.

The apparatus for mitigating fraud may include a server that may be maintained by a target entity, such as a financial institution. The server may store education data and the education website for redirecting users of the financial institution's website when a user selects a fraud website or phishing website. The financial institution may proactively pursue identifying and detecting fraud, phishing, or suspicious behavior by maintaining a server that performs such functions. The financial institution may also maintain a portion of the memory on a server that stores education data and the education website that may be used to educate users.

Data may be compiled relating to educating a user about the fraud, phishing, the targeted entity, the industry in which the fraud is occurring, and the like. The education data may include any suitable educational information. For example, the fraudster may target the financial and banking industry. The education data may include information about the financial industry, the target entity, such as a bank or other lending or investing sources, the act of phishing, information for detecting and preventing future phishing attacks, information about protecting the user from identity or financial theft, information on security in the financial industry, resource information relating to prevention and reporting of fraud or phishing messages and schemes, and any other An educational website may be created that includes the data described above that may educate a user about fraud, phishing, a target entity, the industry in which the fraud occurs, and the like. A user may be convinced that a phishing message is authentic and legitimately requesting personal, financial, identity, and other information about a user. For example, a user may receive a fraudulent electronic mail message or instant message on a computer from a fraudster. The fraudulent message may contain a target entity's logo, trademark, trade dress, or other identifying features of the target entity. The fraudulent message may request information from the user, may contain a link or pointer to a website operated by the fraudster, or other method of obtaining a user's personal, financial, identity, and other unique information.

Aspects of the invention have been described in terms of illustrative embodiments thereof. Numerous additional embodiments, modifications, and variations may exist that remain within the scope and spirit of the appended claims. For example, the steps illustrated in the figures may be performed in other than the recited order and that one or more steps illustrated may be optional. The methods and systems of the above-referenced embodiments may also include other additional elements, steps, computer executable instructions, or computer-readable data structures. In this regard, other embodiments are disclosed herein as well that can be partially or wholly implemented on a computer readable medium, for example, by storing computer executable instructions or modules or by utilizing computer readable data structures.

We claim:

1. A method of detecting fraud, comprising:
   using a processor associated with a fraud mitigation server, compiling education data displayable on an education website;
   storing the education data in a memory associated with the fraud mitigation server that is accessible by at least one computing device;
   using the processor, detecting a fraud website on a computer network accessible by the at least one computing device;
   using a communication module associated with the fraud mitigation server, sending an automated request to a service provider server within the computer network to automatically disable the fraud website;
   using the processor, causing the education data to be presented to a user when the user accesses the fraud website; and
   using the processor, causing removal of the fraud website from the computer network.

2. The method of claim 1, further comprising: using the processor, creating the education website and wherein the causing the education data to be presented includes causing the education website to be displayed on a display associated with the at least one computing device.

3. The method of claim 1, where the fraud website is a phishing website.

4. The method of claim 1, where the education data includes information relating to at least one of a target entity, an industry of the target entity, and information relating to at least one of fraud, phishing, and identity theft.

5. The method of claim 1, where the education website displays the education data on a display associated with the at least one computing device substantially immediately after the user selects the fraud website.

6. The method of claim 1, further comprising: using the communication module, sending the user an alert message when the education data is displayed to the user.

7. The method of claim 1, further comprising: using the processor, displaying the education website on a display associated with the at least one computing device after the request to disable the fraud website is made, the user selecting the fraud website being redirected to the education website during an evaluation of the request to disable the fraud website by the service provider server.

8. A method of protecting a user of an online financial institution website, comprising:
using a processor associated with a fraud mitigation server, creating and storing an education website;
using the processor, identifying a phishing message including a fraud website;
using a communication module associated with the fraud mitigation server, requesting, via an automated request, a service provider server maintaining the fraud website to cause the fraud website to be automatically disabled;
receiving notification of a user selecting the fraud website through the communication module;
using the processor, causing the user to be directed to the education website and preventing the user from receiving an error message; and
using the processor, causing removal of the fraud website.

9. A non-transitory computer-readable storage medium having computer-executable program instructions stored thereon that when executed by a processor, cause the processor to perform:
compiling education data displayable on an education website;
storing the education data in a memory that is accessible by at least one computing device;
detecting a fraud website on a computer network accessible by the at least one computing device;
sending an automated request to a service provider of the computer network to automatically disable the fraud website;
causing the education data to be presented to a user when the user accesses the fraud website; and
causing removal of the fraud website.

10. The non-transitory computer-readable storage medium of claim 9, wherein the processor further performs: creating an education website and causing the education website to be displayed when the request to disable the fraud website is made.

11. The non-transitory computer-readable storage medium of claim 9, where the fraud website is a phishing website.

12. The non-transitory computer-readable storage medium of claim 9, where the education data includes information relating to at least one of a target entity, an industry of the target entity, and information relating to at least one of fraud, phishing, and identity theft.

13. The non-transitory computer-readable storage medium of claim 9, where the education website displays the education data substantially immediately after the user selects the fraud website.

14. The non-transitory computer-readable storage medium of claim 9, where the education data includes information about an industry of a target entity.

15. The non-transitory computer-readable storage medium of claim 9, wherein the processor further performs: rapidly displaying the education website after the request to disable the fraud website is made, the user selecting the fraud website being redirected to the education website during an evaluation of the request to disable the fraud website by the service provider.

16. An apparatus for mitigating fraud comprising:
a detecting module comprising a first processor for detecting a phishing message and identifying a phishing website maintained by a service provider;
a directing module comprising a second processor for causing a user selecting the phishing website to be redirected to an education website; and
a disabling module comprising a third processor for requesting, via an automated request, that the phishing website be automatically disabled and causing removal of the phishing website.

17. The apparatus of claim 16, where the apparatus is maintained by a target entity.

18. The apparatus of claim 17, where the target entity is a financial institution.

* * * * *